Nov. 22, 1927.
C. E. REED
1,649,859
EARTH BORING DRILL
Original Filed March 1, 1927
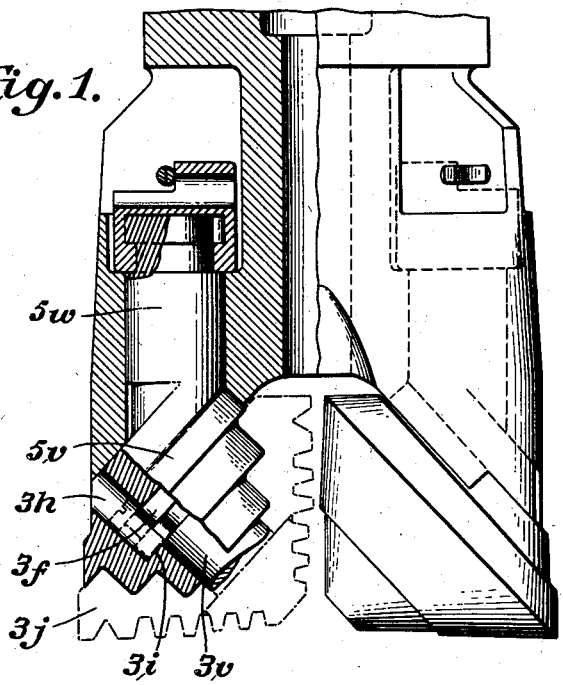
Fig. 1.
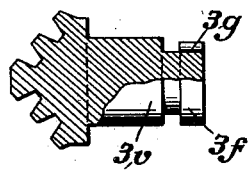
Fig. 2.
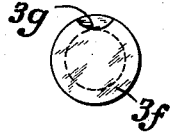
Fig. 3.
Fig. 6.
Fig. 7.
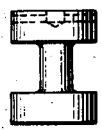
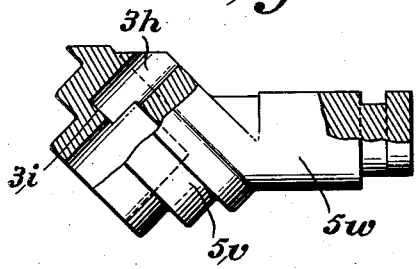
Fig. 4.
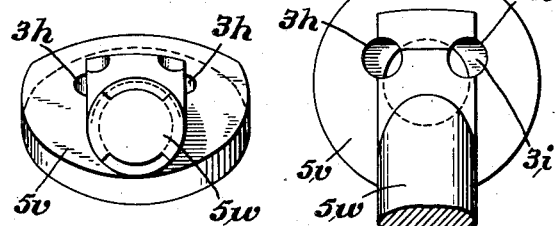
Fig. 5.
Fig. 8.
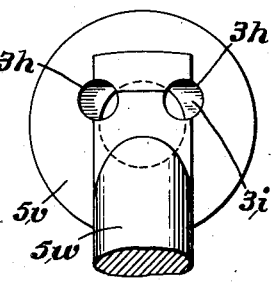
Inventor:
Clarence E. Reed,
by Spear, Middleton, Donaldson & Hall
Attys.

Patented Nov. 22, 1927.

1,649,859

UNITED STATES PATENT OFFICE.

CLARENCE E. REED, OF WICHITA, KANSAS.

EARTH-BORING DRILL.

Original application filed March 1, 1927, Serial No. 171,832. Divided and this application filed June 9, 1927. Serial No. 197,586.

The present specification is a division of that filed by me in the United States Patent Office. No. 171,832, March 1, 1927, and concerns a roller cutter organization in which the roller cutter has a stem mounted in a spindle to have rotary movement therein, locking means being provided to hold the stem in place within the bearing.

In the accompanying drawings:

Figure 1 is a view partly in elevation, partly in section and partly in dotted lines, embodying the invention.

Fig. 2 is a view of one section of the roller cutter detached and partly in section.

Fig. 3 is an end view of the stem of the roller cutter.

Fig. 4 is a view of the spindle member.

Fig. 5 is a plan view of the spindle member.

Figs. 6 and 7 are views of the locking piece.

Fig. 8 is a view of the base flange of the spindle and a part of the shank attached thereto.

The spindle $5^v$ has a shank $5^w$ adapted to be seated in a bore of the bit head to one side of and substantially parallel with the vertical axis of said head, while the spindle or bearing $5^v$ is designed to project at right angles from the inclined face of the inverted V-shaped recess at the lower edge of said head. The roller cutter has a stem or shank $3^v$ adapted to bear within the spindle. This shank is provided with a flange $3^t$ and a gate $3^g$ to cooperate with wings on the interior of the spindle. The wings may be provided by pieces like that shown in Figs. 6 and 7, which are inserted into the spindle through openings $3^h$ in the base flange. The piece which is inserted last may be said to be the locking piece, as it performs the final act of locking the roller cutter to the spindle. These wings or locking pieces are inserted from the back of the base flange and they will be held in place in their sockets by the wall of the head when the unit is mounted in said head. They abut at their ends upon the bottoms $3^i$ of the sockets or recesses in the spindle. The wings or locking pieces need no special means for holding them in place, as they will be confined between the wall of the bit head and the abutment $3^i$, and will be inaccessible except by taking the unit from the head.

The section $3^j$ of the rotary cutter will be mounted on the outer side of the spindle and it will be held in place by the small conical section.

It will be understood that one of the wings may be integral with the spindle, on the interior of the same.

I claim:

1. In combination in an earth boring drill, a bit head and a roller cutter unit consisting of a hollow spindle with a shank extending at an angle thereto and removably seated in a bore of the head to one side of the vertical axis thereof, roller cutter means having a stem entering the hollow spindle, and means within the spindle, inserted through the base thereof for retaining said stem rotatively within said spindle, substantially as described.

2. In combination, a bit head, a hollow spindle carried thereby, a roller cutter having a stem bearing in said hollow spindle, a bayonet joint connection between the said stem and interior of the spindle comprising a projection and a complementary gate and a locking piece inserted into the spindle for retaining the stem in place when the complementary parts register, substantially as described.

3. An earth boring drill according to claim 2 in which the locking piece is inserted into place through said gate of the stem when the said gate is out of registry with its complementary projection.

4. An earth boring drill according to claim 2 in which the spindle is removably mounted on the bit head and the locking piece carried thereby is retained in place by the wall of the bit head, the roller cutter and locking piece being assembled with the hollow spindle before the latter is assembled with the bit head, substantially as described.

5. In combination in an earth boring drill, a bit head, a removable spindle mounted thereon, roller cutter means and a connection between the roller cutter means and spindle consisting of a plurality of wings removably mounted in the spindle, and a gate on the roller cutter means complementary severally to said wings of the spindle, substantially as described.

In testimony whereof, I affix my signature.

CLARENCE E. REED.